United States Patent [19]
Houskeeper

[11] Patent Number: 6,014,163
[45] Date of Patent: Jan. 11, 2000

[54] MULTI-CAMERA VIRTUAL SET SYSTEM EMPLOYING STILL STORE FRAME BUFFERS FOR EACH CAMERA

[75] Inventor: James H. Houskeeper, Draper, Utah

[73] Assignee: Evans & Sutherland Computer Corporation, Salt Lake City, Utah

[21] Appl. No.: 08/870,752

[22] Filed: Jun. 9, 1997

[51] Int. Cl.[7] .................................................. H04N 13/02
[52] U.S. Cl. .............................. 348/47; 348/159; 345/474
[58] Field of Search .................................. 348/47, 48, 49, 348/50, 39, 152, 157, 159, 349, 419, 425, 584, 586, 589, 600; 345/36, 8; 358/87; 395/125

[56] References Cited

U.S. PATENT DOCUMENTS

| | | | |
|---|---|---|---|
| 5,200,818 | 4/1993 | Neta et al. ................................. | 358/87 |
| 5,650,814 | 7/1997 | Florent et al. ............................. | 348/39 |
| 5,657,077 | 8/1997 | DeAngelis et al. ....................... | 348/157 |
| 5,696,892 | 12/1997 | Redmann et al. ....................... | 395/125 |
| 5,703,604 | 12/1997 | McCutchen ................................ | 345/8 |

*Primary Examiner*—Howard Britton
*Assistant Examiner*—Tung Vo
*Attorney, Agent, or Firm*—Thorpe, North & Western, L.L.P.

[57] ABSTRACT

A method and apparatus for producing data in a virtual set memory representing a composite image. The composite image data is produced from a combination of data representing a virtual image and data representing a camera field of view image. The invention includes a plurality of cameras, each disposed for developing data representing a respective field of view and each having a still store frame buffer associated therewith for receiving and storing data representing virtual images. The still store frame buffers are configured for subsequent selective retrieval. The invention also includes a virtual image data source for generating data representing virtual images and for supplying such data to the still store frame buffers associated with each of the plurality of cameras. Finally, the invention includes at least one compositor for compositing data representing the field of view of a selected one of the plurality of cameras and data representing a virtual image retrieved from a still store frame buffer associated with the selected one of the plurality of cameras. The compositor produces data in the virtual set memory.

18 Claims, 2 Drawing Sheets

MULTI-CAMERA VIRTUAL SET SYSTEM EMPLOYING STILL STORE FRAME BUFFERS FOR EACH CAMERA

BACKGROUND OF THE INVENTION

1. The Field of the Invention

This invention relates generally to a virtual set system, and more particularly to a method and apparatus by which a composite image is generated from a system of multiple cameras each having a frame buffer associated therewith to store virtual image data for producing a composite image based on the associated camera's field of view image data and the virtual image data from the frame buffer.

2. The Background Art

Calculating virtual sets is known in the art of computer generated imaging. A virtual set combines scenes viewed and recorded by a camera with scene elements (such as backdrops) from some other source. The scenes recorded by the camera are typically either moving or stationary objects and the scenes are photographed in front of a plain, colored wall commonly referred to as a "blue stage." Typically, the blue stage is colored blue or green. Special equipment or processes are then used to combine the camera scenes with the other scene elements. The combination is usually accomplished using compositing techniques.

For example, a typical application of compositing techniques involves combining a camera scene with a background scene, wherein the camera scene is a live person in the foreground and the background scene is an image or photograph of some other scene (a "synthetic scene"). Using these techniques, everything in the camera scene which is the color of the blue stage (e.g., blue) is replaced with the synthetic scene. Preferably, the combined image will then appear as though the person is located in the background scene.

Rather than just placing the camera scene in front of a two-dimensional background scene (but clearly not blending into the background scene) often it is desirable to make the camera scene appear as if it was immersed within a three-dimensional (3D) environment. In such cases, it is necessary to know, with considerable precision, enough information about the camera to generate the scene that the camera is "seeing" if the background scene were really part of the camera's environment. The background scene is generated with a 3D graphic engine or computer, often referred to as an image generator. Traditionally, an image generator includes a frame buffer that is refreshed with data every cycle. With each refresh, the above calculations require that the image generator know what a camera is "seeing" so that the image generator can create the corresponding scene from a virtual database. The required camera information includes knowing the XYZ position, the orientation (pan, tilt, and roll), field of view (zoom), and focus.

Virtual set systems are typically described as either three-dimensional (3D) virtual set systems or two-dimensional (2D) virtual set systems. A 3D virtual set system relies upon the use of 3D image generators for the real time rendering of 3D imagery for each camera viewport. Real time is defined to be 30 frames per second or better. The advantage of 3D virtual sets is that both the camera and scene elements can be moved freely within the virtual world. This freedom in movement provides the director with maximum flexibility creating video products. However, this freedom comes at a significant cost.

A 3D image generator for use in a 3D virtual set system is typically a very expensive and complex system. This is because rendering complex scenes in three dimensions is computationally demanding. In most 3D virtual set systems, the cost of the image generator represents the majority of the costs of the overall virtual set system. In addition, due to the complex nature of 3D image generation systems, these systems tend to have a higher failure rate than any of the other components of a virtual studio.

A 3D virtual set system using multi-camera configurations typically requires an image generator for each camera. This practice is very expensive and virtual set vendors have attempted to defray the costs of these additional generators by using lower quality, more cost effective graphics systems for the rendering of scenes from preview channels. Preview channels are systems which allow "good enough" graphics for preview use, but are unable to render graphics good enough for actual air time, i.e., a broadcast image. Although preview channels reduce the cost of multi-camera virtual set systems, the use of low cost preview channels introduces a need for some sort of upstream switching to ensure that the correct video image is composited with the correct background imagery. This additional level of switching introduces an additional level of complexity to the overall system design. In those cases when the director needs more than one source of high quality imagery (i.e., fades, dissolves, iso-channels) he is forced to use multiple sources of high quality imagery, which usually equates to multiple image generation systems.

For example, in fades, an image generator is required for each camera, thus, two image generators are required because two cameras are required for the fade. A fade requires two cameras because a first image slowly fades into a second image. The first image requires a high quality virtual image and the second image that is being faded into also requires a high quality virtual image. Both images appear concurrently during parts of the fade. If the second image is using only a preview channel, the fade cannot be carried out properly because the second image is only good enough for preview. Thus, the prior art requires a second image generator.

Contemporary 3D virtual set systems have numerous problems due to the real time nature of 3D virtual set systems. Because the image generation systems are required to generate a complete scene in a single frame time or better, many limitations must be imposed upon the virtual set system. For example, the virtual set databases are strictly limited in terms of the number of surface areas in the scene that must be supplied with an image and the amount of texture in the scenes. These surface areas to be supplied with images are commonly referred to as "polygons" by those skilled in the art. In addition, real time graphics algorithms cannot take advantage of advanced rendering techniques such as ray tracing or radiosity because the complexity of the calculations requires to much processor time. The result of these limitations are scenes that lack realism and the scenes are often described as "cartoon" like.

The 2D virtual set systems are less complex than 3D systems and do not suffer from many of the problems of the 3D systems. Although most of the above problems do not exist in a 2D virtual set system, the 2D virtual set system has other problems that make contemporary systems undesirable. In many video productions, a 2D virtual set system relies upon cameras that are typically fixed in a particular location and allow only pan, tilt, and in some cases zoom and focus. By restricting the movement of the camera, the virtual set designer is able to take advantage of cost effective, high quality image rendering techniques such as ray tracing and radiosity. Prior to a video production, the director can specify the planned location of each of the cameras and the set designer can then pre-render the imagery for each of the cameras.

However, significant limitations of 2D virtual set systems are (i) the impracticality of having 3D objects move in the image and (ii) the impossibility of having free moving cameras. In addition, 2D systems force the director to stay within the pre-determined constraints of each of the cameras pre-rendered scenes. A director typically does not have the flexibility during production time to re-position any of the cameras.

Of current interest is a virtual set system that takes advantage of many of the attributes of traditional 2D virtual set systems, but, in terms of performance, also incorporates a wide range of the attributes of 3D image generation systems.

OBJECTS AND SUMMARY OF THE INVENTION

It is an object of the present invention to provide a method and apparatus for generating data in a virtual set using multiple cameras and a frame buffer associated with each camera for storing data representing a virtual image.

It is another object of the invention to provide such a method and apparatus for compositing data representing an image of a camera's field of view with data representing a virtual image so that data representing a virtual set may be stored and retrieved.

It is also an object of the invention to provide such a method and apparatus for taking advantage of the attributes of traditional two-dimensional (2D) virtual set systems while realizing a three-dimensional (3D) image generation system.

It is a further object of the invention, in accordance with one aspect thereof, to provide such a method and apparatus wherein each physical camera makes use of a camera tracker for calibrating an image source when a virtual image is to be produced.

It is still another object of the invention, in accordance with one aspect thereof, to provide such a method and apparatus wherein each physical camera makes use of a video delay for synchronizing virtual image data from an image source with camera field of view data.

It is an additional object of the invention to provide such a method and apparatus wherein a portable computer program causes the hardware pieces of the virtual set to interact as a whole and with less hardware than virtual set systems of the prior art.

It is yet another object of the invention, in accordance with one aspect thereof, to provide such a method and apparatus wherein an image generator is used to produce data representing a virtual image.

It is still another object of the invention, in accordance with another aspect thereof, to provide such a method and apparatus wherein external video is used to produce a portion of the data representing a virtual image and the external video can be derived from any video source.

The above objects and others not specifically recited are realized through a method and apparatus for producing data in a virtual set memory representing a composite image. The composite image data is produced from a combination of data representing a virtual image and data representing a camera field of view image. The invention includes a plurality of cameras, each disposed for developing data representing a respective field of view and each having a frame buffer associated therewith for receiving and storing data representing virtual images. The frame buffers are configured for subsequent selective retrieval. The invention also includes a virtual image data source for generating data representing virtual images and for supplying such data to the frame buffers associated with each of the plurality of cameras. Finally, the invention includes at least one compositor for compositing data representing the field of view of a selected one of the plurality of cameras and data representing a virtual image retrieved from a frame buffer associated with the selected one of the plurality of cameras. The compositor produces data in the virtual set memory.

It is an advantage of the present invention to use multiple cameras and a frame buffer associated with each camera because the system does not require multiple image generators to function in real time.

It is another advantage of the invention to require no image generators because the virtual set system of the present invention is less expensive to realize.

It is also an advantage of the invention to take advantage of the attributes of traditional two-dimensional (2D) virtual set systems while realizing a three-dimensional (3D) image generation system because a 3D system can be realized at a lower cost with better quality images.

It is a further advantage of the invention to provide such a method and apparatus wherein each physical camera makes use of a still store frame buffer for storing the last virtual image generated by the virtual image source and wherein a single camera can then be designated as the fall back camera where that camera makes use of the stored virtual image if the virtual set system were to fail in part.

It is an additional advantage of the invention to provide such a method and apparatus wherein a portable computer program causes the hardware pieces of the virtual set to interact as a whole and with less hardware than virtual set systems of the prior art.

It is another advantage of the invention to provide a computer program that can be ported to multiple systems without rewriting the computer program.

It is still another advantage of the invention to provide a virtual set system in which various sources of virtual images can be used with the same software and same frame buffers.

It is yet another advantage of the invention to provide such a method and apparatus wherein an image generator or any other external video source can be used to produce data representing a virtual image because this eliminates the requirement for an image generator in the virtual set system.

Additional objects and advantages of the invention will be Additional objects and advantages of the invention will be set forth in the description which follows, and in part will be apparent from the description, or may be learned by the practice of the present invention. The objects and advantages of the invention may be realized and obtained by means of the instruments and combinations particularly pointed out in the appended claims.

BRIEF DESCRIPTION OF THE DRAWINGS

The above and other objects, features, and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the appended claims.

The virtual set system of the present invention takes advantage of many of the attributes of traditional two-dimensional (2D) virtual sets systems, but, in terms of performance, also incorporates a wide range of the attributes of three-dimensional (3D) image generation systems. The virtual set system of the present invention is essentially a system of multiple cameras using a frame buffer for each camera. The frame buffers of the invention are essentially a personal computer with a frame buffer card therein; the frame buffer card being designed to capture, store, and output a single frame imagery, i.e., a "still store" frame buffer card. Each still store frame buffer is large enough to support images as large as 2K×2K. The still store frame buffers create a system that can operate without a separate image generator for each camera. Thus, various embodiments are possible with the frame buffers of the present invention. For example, one embodiment is a single image generator capable of outputting virtual image data to multiple still store frame buffers of multiple cameras. Another embodiment is a system that can operate without using any image generators. The still store frame buffers of the present invention can be used to generate virtual images independently of an image generator. In other embodiments, external video data can be passed directly to the still store frame buffers, or alternatively, passed through the image generator (or other virtual image source) prior to reaching the still store frame buffers.

A single image generator can be used with multiple cameras because an image generator is only required to redraw virtual images when the air time (or broadcast) camera is moving. When the air time camera stops moving, the last image drawn by the image generator is stored in the still store frame buffer, Thus, the image generator resource can then be applied to other cameras in the virtual set system.

The still store frame buffer of each non-moving camera uses the last virtual image data generated by the image generator that had been previously stored on the internal frame buffer card. This data is then scanned out of the frame buffer and is composited with video data from the camera. In this manner, high quality virtual set data is generated for each camera of the virtual set system even though the system has only a single image generator.

Figure 1:
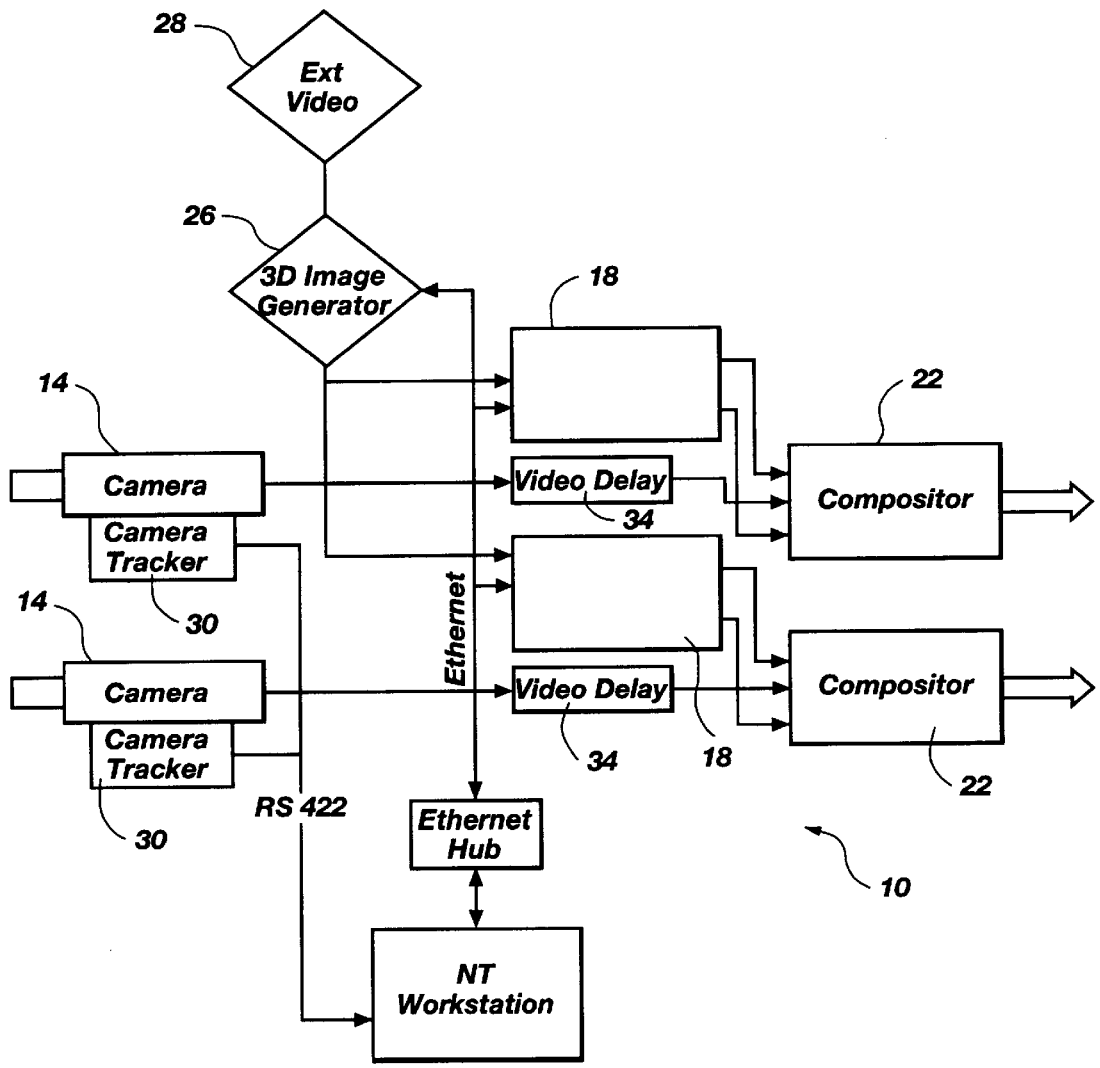
FIG. 1 is a schematic view of a virtual set system using multiple cameras, multiple frame buffers, multiple compositors, and a single image generator.

FIG. 1 is a schematic view of a virtual set system 10. The virtual set system 10 is for generating a composite image from a combination of a virtual image and a camera field of view image. FIG. 1 illustrates a system 10 with multiple cameras 14, multiple still store frame buffers 18, multiple compositors 22, and a single image generator 26. Each camera 14 has a field of view and a still store frame buffer 18 associated therewith. As shown in FIG. 1, each still store frame buffer 18 is connected to both a camera 14 and the image generator 26.

The still store frame buffers 18 are for receiving and storing data representing virtual images and for providing selective retrieval of the virtual image data. The virtual image data to be retrieved is located in one of the still store frame buffers 18 associated with one of the cameras 14 and represents a single virtual image. One possible frame buffer is a personal computer with a TARGA 1000 frame buffer board configured with a HUB2 chip and 16 megabytes of memory.

The virtual set system 10 of FIG. 1 is shown having multiple compositors 22 for compositing data representing an image of the field of view of a camera 14 and virtual image data representing one of the virtual images from one of the still store frame buffers 18. The compositor 22 produces data in a virtual set memory for generating a virtual set. A compositor allows many digital images to be layered together in a way that creates a single, composite picture. The composite picture (or image) appears with background scenes, animated elements and objects, and/or live actors seamlessly merged into a believable broadcast image. One compositor that could be used is the Ultimatte 45.

As shown in FIG. 1, the source of the virtual image data that is composited with the camera 14 field of view image data is an image generator 26. The image generator 26 (or virtual image data source) is for generating the data representing the virtual images and is electrically coupled to each of the frame buffers 18 associated with each of the plurality of cameras 14. In addition, the virtual image data can include data from an external video 28. This data from the external video 28 can be used as a video insert into the virtual set system 10.

Although FIG. 1 shows image generator 26 and external video 28, it is to be understood that virtual image data can be produced by additional sources.

The embodiment shown in FIG. 1 also includes camera trackers 30 electrically coupled between each of the cameras 14 and the virtual image data source 26. The camera tracker 30 provides data, to the virtual image data source 26, on camera position and movement. This data includes pan, tilt, zoom, and focus, thereby enabling the virtual image data source 26 to consider camera position data when generating the data representing the virtual images.

In addition, the cameras 14 of FIG. 1 also include a video delay 34 electrically coupled between each of the plurality of cameras 14 and the compositors 22. By appropriately delaying the camera field of view data, the video delay 34 synchronizes the camera field of view data with the virtual image data and thus, properly sets the data streams for compositing the data of the two images.

The virtual image data to be composited includes data for a three-dimensional graphic having a foreground and a background. In addition, the virtual image data includes data for a matte channel. The data for the three-dimensional graphic and for the matte channel can be retrieved from one of the still store frame buffers 18 after the virtual image data source 26 stores data in the frame buffer.

Although FIG. 1 shows a preferred embodiment of one image generator 26 for generating three-dimensional image data to be stored in the frame buffers 18, the virtual set system 10 can include more than one image generator. When a single image generator 26 is used, the generator will be sharing resources with multiple cameras 14. However, when multiple image generators are used, each camera could have its own image generator.

In an alternative embodiment, the virtual set system 10 can include one compositor electrically coupled to each of the frame buffers 18 and to each of the video delays 34 from each of the cameras. As stated above, the compositor is for layering the data representing an image of each camera's field of view and the data representing the virtual images from one of the frame buffers associated with one of the plurality of cameras. In this embodiment, data representing a single composite image is stored in the virtual set memory. Preferably, a compositor is electrically coupled to each of the frame buffers 18 so that each compositor can be tuned to each camera.

Figure 2:
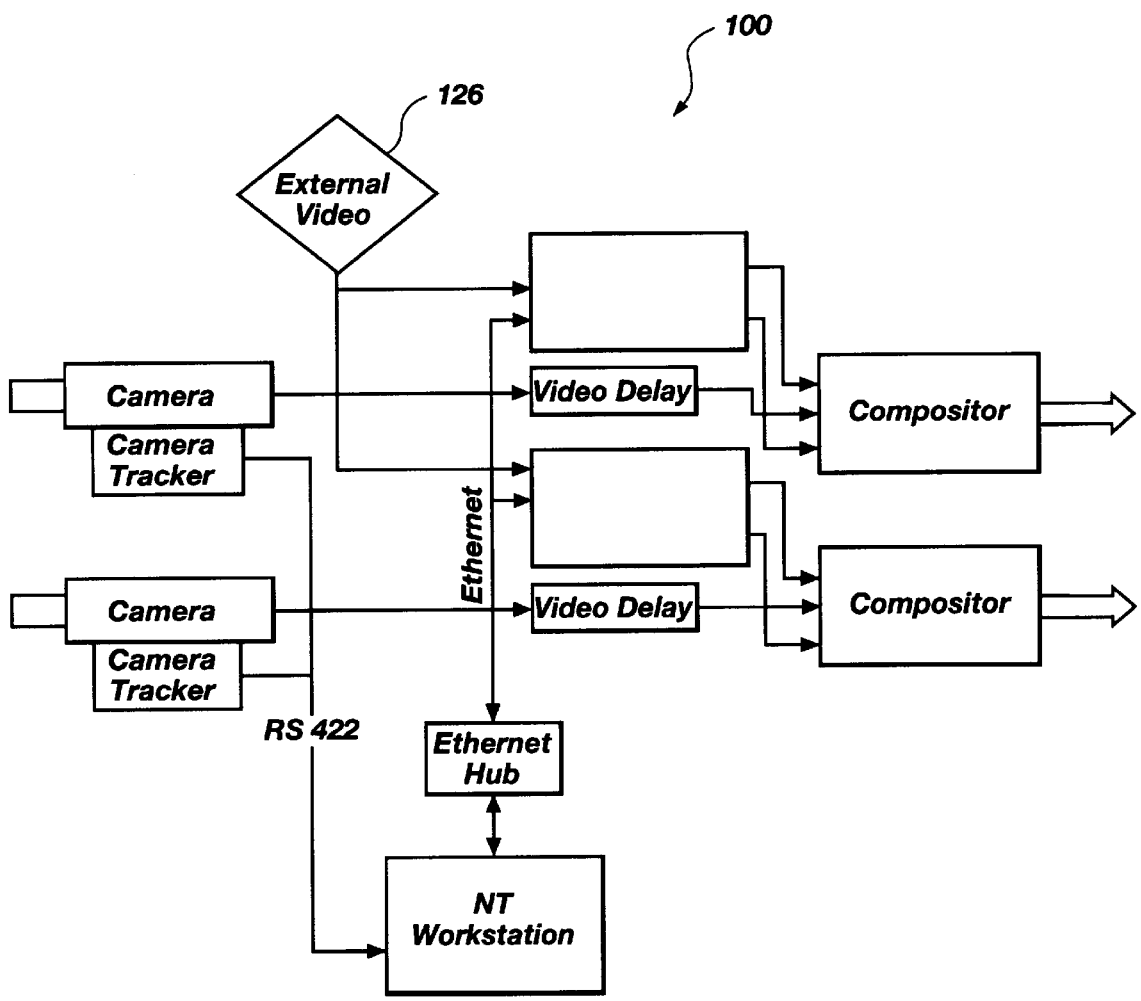
FIG. 2 is a schematic view of a virtual set system using multiple cameras, multiple frame buffers, multiple compositors, and an external video as a video insert into the virtual set system.

FIG. 2 depicts another embodiment of a virtual set system 100. The embodiment is substantially the same as the FIG. 1 embodiment except that the still store frame buffer system of each camera is used for producing the three-dimensional video imagery to generate the data representing virtual images. Each still store frame buffer card is placed in a personal computer that can be used to generate a virtual image and store the image in the frame buffer card. In addition, an external video source 126 can be used to insert live video into the virtual image data that has been generated and stored in the frame buffer.

To allow for pan and tilt of the cameras, the actual image is rendered by the frame buffer system at a resolution that is several times larger than would be visible through the camera in one instance of time. Those skilled in the art typically define resolution in terms of vertical and horizontal; vertical referring to the number of scanlines and horizontal referring to the number of pixels per scanline; pixels being defined to be a picture element. Thus, a larger resolution is essentially a larger image. As the camera pans or tilts, the frame buffer system pages in the appropriate imagery out of the larger pre-rendered image. Due to the use of pre-rendered imagery and the availability of processor time, 2D virtual set systems typically have very high image quality.

With the apparatus of FIG. 1, the user can produce data in a virtual set memory that represents a composite image from a combination of a virtual image and a camera field of view image by the following steps:

(a) providing a plurality of cameras, each having a field of view and each having a still store frame buffer associated therewith; (b) providing a virtual image data source for generating data representing a virtual image;

(c) storing the data representing the virtual image in each of the still store frame buffers associated with each of the plurality of cameras;

(d) selectively retrieving the data representing the virtual image from one of the still store frame buffers of one of the plurality of cameras; and (e) compositing data representing a field of view of one of said plurality of cameras and data representing one of the virtual images from one of the still store frame buffers to produce data in the virtual set memory.

As in the description of FIG. 1, the cameras should be provided with a camera tracker and a video delay. Also, the virtual image data source could be an image generator for generating a three-dimensional image having a foreground and a background. The image generator could also be used for generating a matte channel.

The virtual image data produced for the compositor could be a combination of virtual image data from an image generator and an external video signal including live video. Thus, the virtual image data would be three-dimensional data sets rendered by the assistance of processors. The above steps are commonly used for providing a virtual set image based on the data in the virtual set memory.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed and desired to be secured by United States Letters Patent is:

1. Apparatus for producing data in a virtual set memory representing a composite image from a combination of a virtual image and a camera field of view image, the apparatus comprising:

a plurality of cameras, each disposed for capturing data representing a respective field of view and each having a frame buffer associated therewith for receiving and storing data representing virtual images, for subsequent selective retrieval;

a virtual image data source for generating data representing virtual images and for supplying such data to the frame buffer associated with a broadcast camera configured for moving spatially, wherein the last image drawn by the image generator is stored in the frame buffer when the broadcast camera stops moving and then virtual image is supplied to another single movable camera; and a means for compositing data representing the field of view of a selected one of the plurality of cameras and data representing a virtual image retrieved from a frame buffer associated with the selected one of the plurality of cameras, to produce data in the virtual set memory.

2. Apparatus as in claim 1 wherein said plurality of cameras further comprise a camera tracker electrically coupled between each of the plurality of cameras and the virtual image data source, wherein the camera tracker provides, to the virtual image data source, data on camera position and movement, including pan, tilt, zoom, and focus, thereby enabling the virtual image data source to consider camera position data when generating the data representing virtual images.

3. Apparatus as in claim 1 wherein said plurality of cameras further comprise a video delay electrically coupled between each of the plurality of cameras and the means for compositing data, wherein the data representing the field of view of the selected one of the plurality cameras is appropriately delayed for compositing with the data representing a virtual image.

4. Apparatus as in claim 1 wherein the data representing a virtual image comprises data for a three-dimensional graphic having a foreground and a background, and data for a matte channel.

5. Apparatus as in claim 1 wherein said virtual image data source comprises at least one image generator for generating three-dimensional image data to be stored in the frame buffers, the at least one image generator sharing resources with the plurality of cameras.

6. Apparatus as in claim 1 wherein said virtual image data source comprises an external video camera for producing video images to generate the data representing virtual images.

7. Apparatus as in claim 6 wherein the external video camera produces live video.

8. Apparatus as in claim 1 wherein the means for compositing comprises at least one compositor electrically coupled to each of the frame buffers and to each of the video delays of each of the cameras, the at least one compositor for layering the data representing the field of view of the selected one of the plurality of cameras and the data representing the virtual image from one of the frame buffers associated with one of the plurality of cameras, wherein data representing a single composite image is stored in the virtual set memory.

9. Apparatus as in claim 8 wherein the at least one compositor comprises a compositor electrically coupled to each of the frame buffers associated with each of the plurality of cameras and wherein said each compositor is tuned to each camera.

10. Apparatus as in claim 1 wherein the virtual set memory comprises data representing a composite image including a virtual image and a camera field of view image.

11. A method for producing data in a virtual set memory representing a composite image from a combination of a virtual image and a camera field of view image, the method comprising the steps of:
   (a) providing a plurality of cameras, each having a field of view and each having a frame buffer associated therewith;
   (b) providing a virtual image data source for generating data representing a virtual image;
   (c) storing the data representing the virtual image in the frame buffers associated with one broadcast camera while said camera is moving, wherein the last image drawn by the image generator is stored in the frame buffer when the broadcast camera stops moving and the virtual image is supplied to another single moving camera;
   (d) selectively retrieving the data representing the virtual image from one of the frame buffers of one of the plurality of cameras; and
   (e) compositing data representing a field of view of one of said plurality of cameras and the data representing the virtual image of one of the frame buffers to produce data in the virtual set memory.

12. The method of claim 11 wherein step (a) further comprises providing a camera tracker and a video delay associated with each of the plurality of cameras.

13. The method of claim 11 wherein step (b) comprises providing an image generator for generating a three-dimensional image having a foreground and a background.

14. The method of claim 13 wherein step (b) further comprises providing an image generator for generating a matte channel.

15. The method of claim 11 wherein step (b) comprises providing an external video signal including live video in three-dimensional data sets rendered by processors.

16. The method of claim 11 wherein step (e) comprises providing a virtual set image based on the data in the virtual set memory.

17. The apparatus of claim 1 wherein the virtual image data source is a plurality of virtual image data sources wherein each of said data sources is combined with the frame buffer and provides virtual images directly to the frame buffer when the camera is not moving.

18. A method for producing data in a virtual set memory representing a composite image from a combination of a virtual image and a camera field of view image, the method comprising the step of:
   (a) providing a plurality of cameras, each having a field of view and each having a frame buffer associated therewith;
   (b) providing a virtual image data source in each frame buffer for rendering data representing a virtual image;
   (c) rendering and storing the data representing the virtual image in each of the frame buffers associated with each camera when a camera is not moving;
   (d) selectively retrieving the data representing the virtual image from one of the frame buffers of one of the plurality of cameras; and
   (e) compositing data representing a field of view of one of said plurality of cameras and the data representing the virtual image in the corresponding frame buffer to produce data in the virtual set memory.

* * * * *